United States Patent
Suzuki et al.

(10) Patent No.: US 7,857,525 B2
(45) Date of Patent: Dec. 28, 2010

(54) OPTICAL CONNECTOR

(75) Inventors: Kanako Suzuki, Hitachi (JP); Yoshihisa Kato, Hitachi (JP); Noribumi Shiina, Hitachi (JP); Kazumasa Ohsono, Hitachi (JP); Tomoyuki Nisio, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 313 days.

(21) Appl. No.: 11/964,749

(22) Filed: Dec. 27, 2007

(65) Prior Publication Data

US 2008/0159696 A1 Jul. 3, 2008

(30) Foreign Application Priority Data

Dec. 27, 2006 (JP) .............................. 2006-352553

(51) Int. Cl.
*G02B 6/36* (2006.01)
*G02B 6/26* (2006.01)
*G02B 6/30* (2006.01)
*G02B 6/38* (2006.01)
*G02B 6/255* (2006.01)

(52) U.S. Cl. ............................ 385/83; 385/27; 385/28; 385/39; 385/42; 385/49; 385/50; 385/55; 385/60; 385/65; 385/72; 385/73; 385/77; 385/78; 385/80; 385/97; 385/98; 385/99

(58) Field of Classification Search .................. 385/27, 385/28, 39, 42, 49, 50, 55, 60, 65, 72, 73, 385/77, 78, 80, 83, 97, 98, 99
See application file for complete search history.

(56) References Cited

U.S. PATENT DOCUMENTS 5,217,811 A   6/1993 Filas et al.
5,266,352 A  11/1993 Filas et al.
5,363,461 A * 11/1994 Bergmann .................... 385/78
5,377,289 A * 12/1994 Johnson et al. ............... 385/65

(Continued)

FOREIGN PATENT DOCUMENTS

EP           0 398 573          11/1990

(Continued)

OTHER PUBLICATIONS

"Adhesives for Fiber Optic Assembly" (AFOA), Loctite. https://tds.us.henkel.com//NA/UT/HNAUTTDS.nsf/web/4C5B3B6652520EFC882571870000D647/$File/3106-EN.pdf.*

(Continued)

*Primary Examiner*—Brian M. Healy
*Assistant Examiner*—Hung Lam
(74) *Attorney, Agent, or Firm*—Antonelli, Terry, Stout & Kraus, LLP.

(57) ABSTRACT

An optical connector according to the present invention comprises a ferrule and a V-groove board connected to the ferrule, wherein a first optical fiber and a second optical fiber being butt jointed in a V-groove formed in the V-groove board so as to be interconnected; the second optical fiber is connected to the first optical fiber through a refractive index matching material of cross-link curing type applied to an end surface on the V-groove board side of the first optical fiber; and spaces are provided in the V-groove so as to relax stress loaded on the refractive index matching material of cross-link curing type.

12 Claims, 5 Drawing Sheets

U.S. PATENT DOCUMENTS

| | | | |
|---|---|---|---|
| 5,631,985 A | 5/1997 | Yamada et al. | |
| 2001/0001623 A1* | 5/2001 | Inada et al. | 385/99 |
| 2003/0091294 A1* | 5/2003 | Sasaki et al. | 385/71 |
| 2003/0185520 A1* | 10/2003 | Bookbinder et al. | 385/73 |
| 2005/0244108 A1* | 11/2005 | Billman et al. | 385/60 |

FOREIGN PATENT DOCUMENTS

| | | |
|---|---|---|
| JP | 55-153912 | 12/1980 |
| JP | 03-175406 | 7/1991 |
| JP | 08-114724 | 5/1996 |
| JP | 08-122562 | 5/1996 |
| JP | 11-072641 | 3/1999 |
| JP | 11-101919 | 4/1999 |
| JP | 2000-241660 | 9/2000 |
| JP | 2001-324641 | 11/2001 |

OTHER PUBLICATIONS

Abstracted-Pub.No. CA 2015481A, "Refractive index matching encapsulating composition", Filas et al.*

Office Action issued in Chinese Patent Application No. 200710301160.X on Jun. 9, 2010.

* cited by examiner (a)

(b)

OPTICAL CONNECTOR

CLAIM OF PRIORITY

The present application claims priority from Japanese application serial no. 2006-352553 filed on Dec. 27, 2006, the content of which is hereby incorporated by reference into this application.

BACKGROUND OF THE INVENTION

1. Field of the Invention

The present invention relates to an optical connector for interconnecting optical fibers, and more particularly, to an optical connector for connecting a single-mode fiber to a holey fiber at an optical fiber laying site.

2. Description of Related Art

FIG. 5 is a schematic illustration showing a transversal cross sectional view of a typical holey fiber. As shown in FIG. 5, a holey fiber 51 with a fiber diameter of 125 μm comprises a cladding 52 made of quartz, a core 53 in which germanium (Ge) is added to quartz so that the core 53 has a refractive index slightly higher than that of the cladding 52, and hollows 54 formed around the core 53. Since the holey fiber 51 has a characteristic that is a small increase in transmission loss caused by a bend, the holey fiber 51 has attracted much attention in that it can be wired easily at outdoor sites such as ordinary houses, condominiums, and offices.

Usually, mechanical splices and optical connectors are widely used to interconnect optical fibers at a laying site. In general, it is effective to use a mechanical splice for a permanent connection and to use an optical connector when optical fibers are connected and disconnected frequently. In either case, the optical fibers are physically interconnected by applying a thrust force in the axial direction at ends of both fibers. The optical fiber is generally fragile, so when using an optical connector, the optical fiber is inserted into a ferrule to protect it, enabling the optical fiber end to be physically brought into contact (e.g., see JP-A Hei 08(1996)-114724, U.S. Pat. No. 5,631,985).

FIG. 6 is a schematic illustration showing a longitudinal cross sectional view of an example of a conventional optical connector. As shown in FIG. 6, the main body of the optical connector 61 comprises a ferrule 62, a V-groove board 63, a holding board 64, and a housing 65; an optical fiber 11a is included in the main body. It is proposed that the optical connector 61 connects the optical fiber 11a to another optical fiber 11b by applying a refractive index matching material or adhesive in a liquid or grease state between the optical fiber ends to be interconnected, wherein the refractive index of the refractive index matching material or adhesive has the same or approximately the same refractive index as the cores of the optical fibers 11a and 11b (e.g., see JP-A-2000-241660, JP-A Hei 11(1999)-72641, JP-A Hei 11(1999)-101919, and JP-A Hei 08(1996)-122562).

In other optical connectors, it is known that a solid refractive index matching material, such as a film, is used instead of the above refractive index matching material in a liquid or grease state (e.g., see JP Patent No. 2676705, JP-A-2001-324641, and JP-A Shou 55(1980)-153912).

At an actual optical fiber laying site, a procedure for interconnecting fibers in the optical connector is as follows. FIG. 7 is a schematic illustration showing the conventional optical connector fixed to a jig for interconnecting fibers. FIG. 8 is schematic illustrations showing transversal cross sectional views of the conventional optical connector in a procedure for interconnecting fibers, (a) before inserting wedges; and (b) after inserting wedges into clearances of the optical connector. As shown in FIGS. 7, 8(a) and 8(b), the optical connector 61 is fixed to a jig 71; wedges 72 are inserted into clearances between the holding board 64 and the V-groove board 63; a cut optical fiber is inserted into the V-groove 66; and the inserted optical fiber is connected to the optical fiber pre-included in the optical connector 61 through a refractive index matching material r6. In this procedure, a refractive index matching material or adhesive is applied to the end surfaces of the optical fibers, and the optical fibers are butt jointed by being matched. This interconnection method thereby keeps air out of the connection ends and eliminates Fresnel reflection that would otherwise be caused by air, reducing the connection loss.

However, in the case that the refractive index matching material r6 is used to connect the holey fiber 51, which has hollows, to the optical fiber 11a pre-included in the optical connector 61, when the refractive index matching material r6 may be a silicone or paraffinic one in a liquid or grease state in a conventional method, the refractive index matching material r6 then enters the hollows 54 of the holey fiber 51. The refractive index at the hollows 54 is largely changed by the refractive index matching material r6 entered in the hollows 54, thereby significantly increasing the transmission loss.

There is another problem when the refractive index matching material r6 enters the hollows 54. It is that the amount of refractive index matching material r6 between the fiber ends at the connected part decreases by an according amount, and thus voids and bubbles are likely to be generated between the ends, thereby increasing a connection loss between the fibers.

A method in which a film as a refractive index matching material in a solid state is used instead of one in a liquid or grease state to connect a holey fiber 51 to an optical fiber is advantageous in that the connection loss is small. In this method, however, compression or tensile stress is loaded on the film when, e.g., the ambient temperature changes. The refractive index of the film is changed due to a deformation, i.e., an optical return loss is changed, and therefore stable optical characteristics cannot be obtained.

In another method, the hollows 54 in the end of the holey fiber 51 are sealed before the holey fiber 51 is connected. This method is not suitable to a laying site at which a simple and easy connection is required, because a special device is needed and much time is taken for the treatment, requiring an additional cost.

Furthermore, a fusion splicing method is also available as the connection method. This method is also problematic because a fusing machine is required and the method cannot be applied to connectors used for a simple connection made at a laying site in a general manner.

SUMMARY OF THE INVENTION

Under these circumstances, it is an object of the present invention to provide an optical connector that suppresses an increase in connection loss at a connected part even if a holy fiber is used, and ensures a small change in optical return loss.

(1) According to one aspect of the present invention, an optical connector comprises a ferrule and a V-groove board connected to the ferrule, wherein a first optical fiber and a second optical fiber are butt jointed in a V-groove formed in the V-groove board so as to be interconnected; the second optical fiber is connected to the first optical fiber through a refractive index matching material of cross-link curing type applied to an end surface on the V-groove board side of the first optical fiber; and a space is provided in the V-groove so as to relax stress loaded on the refractive index matching material of cross-link curing type.

In the above invention (1), the following modifications and changes can be made.

(i) Shape of the space is cubic, rectangular box-like, or semi-columnar in the longitudinal direction of the V-groove.

(ii) Shape of the space is cubic or a rectangular box-like in the longitudinal direction of the V-groove; and one side of the shape is within a range of 5 to 40 µm.

(iii) The refractive index matching material of cross-link curing type has a refractive index of 1.46±0.05, an optical permeability of 80% or more, a break elongation of 50% or more, and a glass adhesive force of 50 g or more per 10-mm width.

(iv) A buildup thickness of refractive index matching material of the cross-link curing type is within a range of 5 to 100 µm.

(v) The second optical fiber is a single-mode fiber or a holey fiber.

ADVANTAGES OF THE INVENTION

The present invention provides an optical connector that can interconnect fibers without losing stable optical characteristics (transmission characteristics) even connecting a holey fiber. Furthermore, the use of the inventive optical connector can simplify a connection work at a fiber laying site.

DETAILED DESCRIPTION OF THE PREFERRED EMBODIMENTS

Preferred embodiments according to the present invention will be described below with reference to the accompanying drawings. However, the present invention is not limited to the embodiments described herein.

The optical connector of the present invention can be used to interconnect optical fibers at a field such as an optical fiber laying site in a simplified manner, without performing a polishing process or fusing process; the optical fibers can be interconnected just after their ends have been cut.

Figure 1:
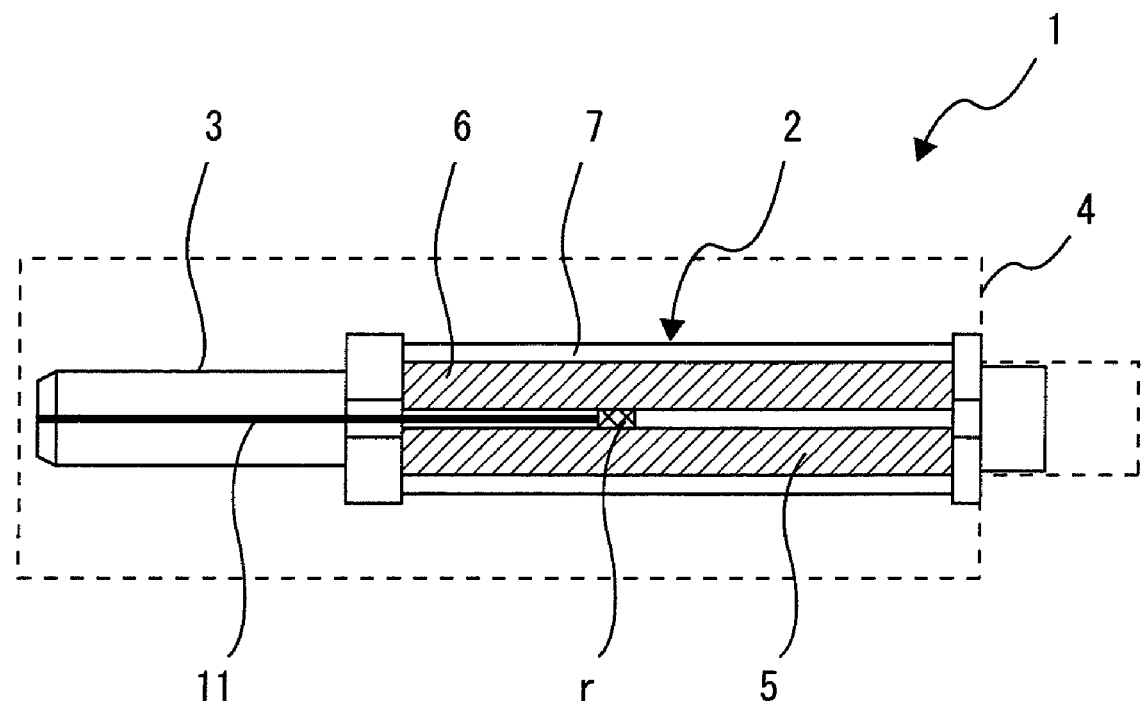
FIG. 1A is a schematic illustration showing a longitudinal cross sectional view of an optical connector according to an embodiment of the present invention.
FIG. 1B is a schematic illustration showing a transversal cross sectional view of an example of a V-groove board according to an embodiment of the present invention.
Figure 1:
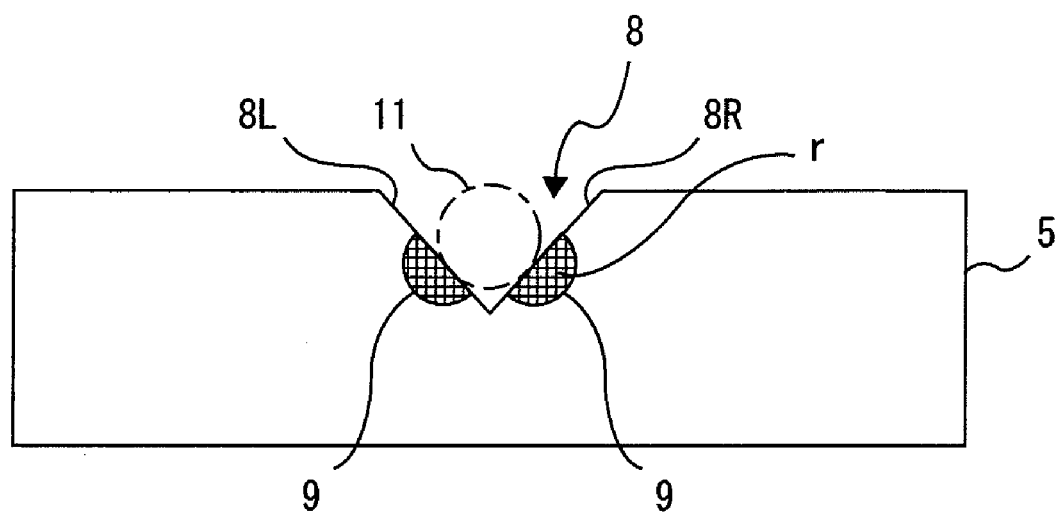

FIG. 1A is a schematic illustration showing a longitudinal cross sectional view of an optical connector according to an embodiment of the present invention. FIG. 1B is a schematic illustration showing a transversal cross sectional view of a V-groove board according to an embodiment of the present invention. Here, FIG. 1B schematically shows a state in which the refractive index matching material r of cross-link curing type is released to (flows in) the spaces 9 so as to relax the stress (details will be described later).

Figure 6:
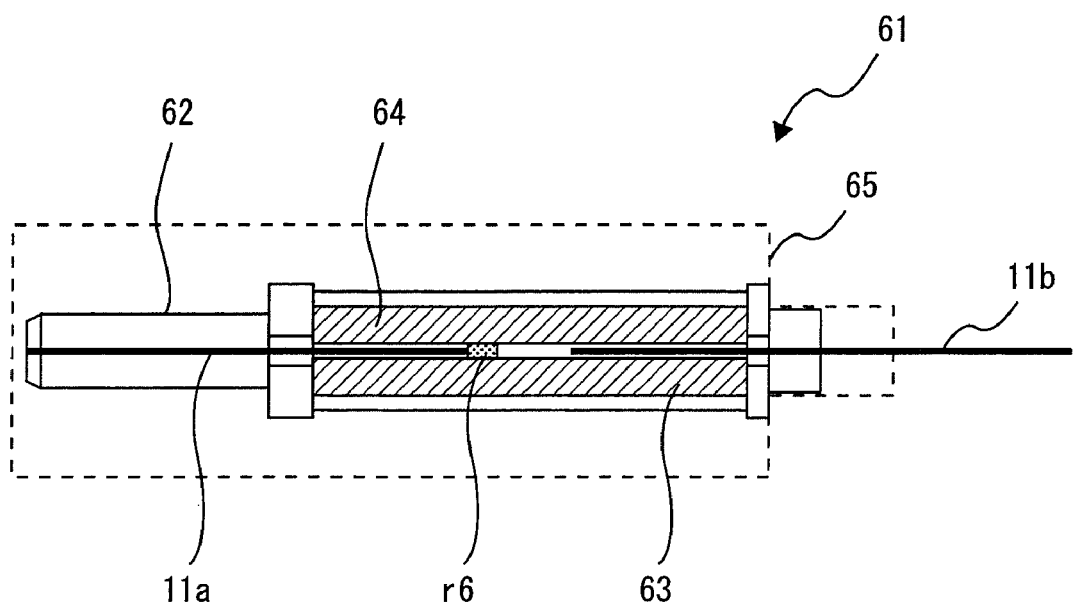
FIG. 6 is a schematic illustration showing a longitudinal cross sectional view of a conventional optical connector.
Figure 7:
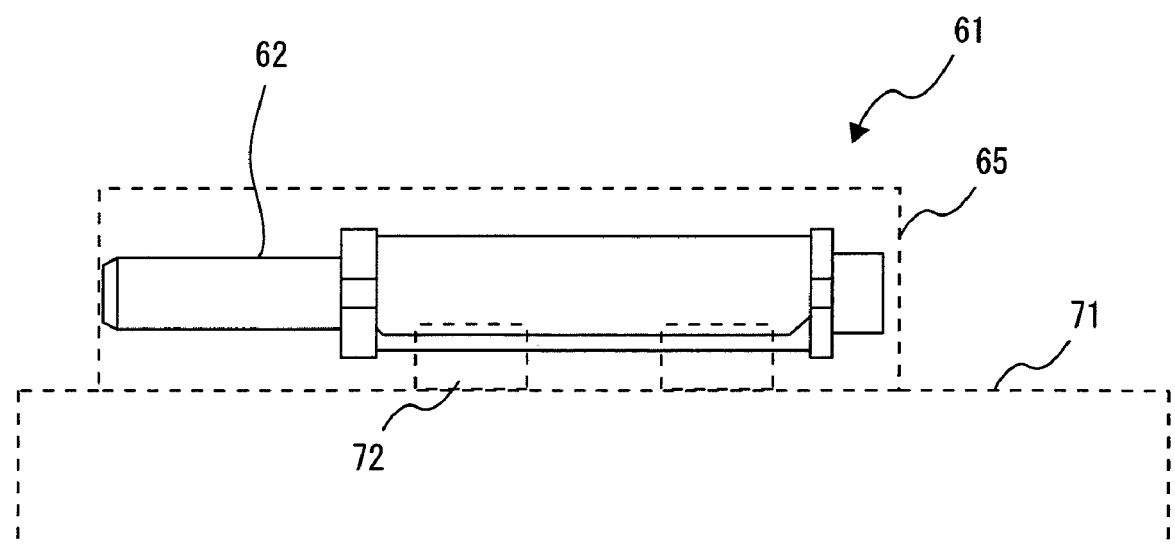
FIG. 7 is a schematic illustration showing the conventional optical connector fixed to a jig for interconnecting fibers.
Figure 8:
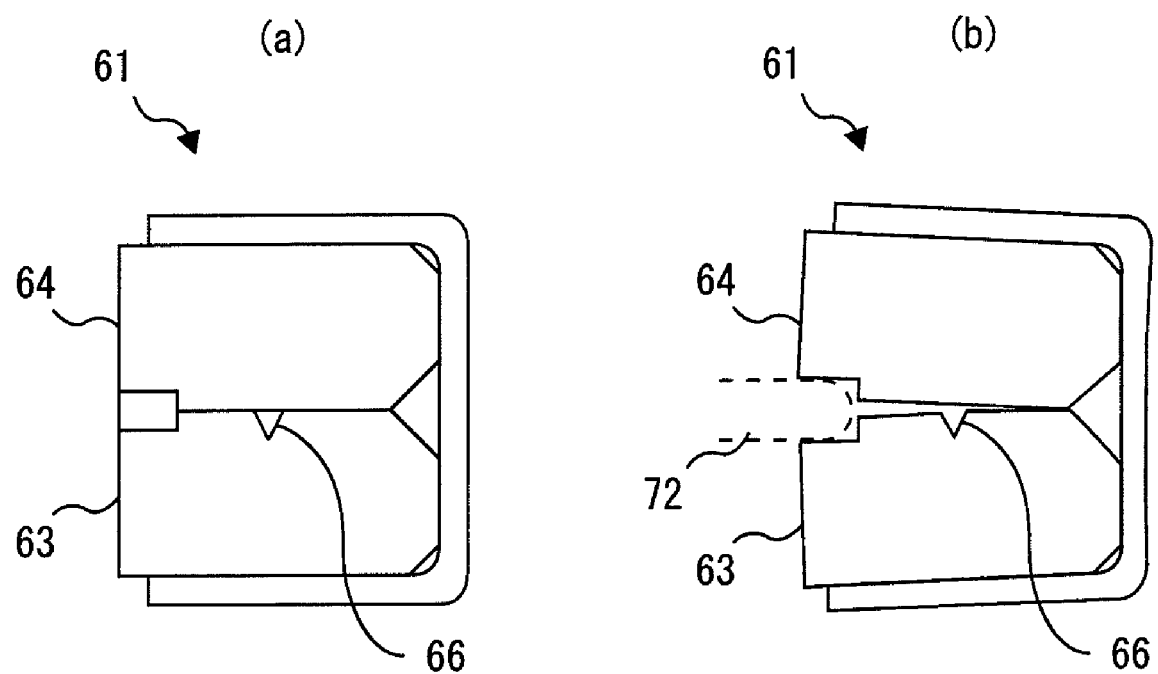
FIG. 8 is schematic illustrations showing transversal cross sectional views of the conventional optical connector in a procedure for interconnecting fibers, (a) before inserting wedges; and (b) after inserting wedges into clearances of the optical connector.

As shown in FIGS. 1A and 1B, although an optical connector 1 according to this embodiment has almost the same structure as the conventional optical connector 61 illustrated in FIGS. 6 to 8, there is a difference in which a space 9 is provided in a V-groove 8 of a V-groove board 5 and a refractive index matching material r of cross-link curing type is used. The optical connector 1 mainly comprises a main connector body (mechanical splice) 2, a ferule 3 that is connected to an end (the left end in FIG. 1A) of the main connector body 2 and that holds an end of a first optical fiber (e.g., a single-mode fiber 11), and a housing 4 that accommodates the main connector body 2 and ferule 3.

The main connector body 2 comprises a list V-groove board 5, a holding board 6 that is overlaid on and is openably attached to the V-groove board 5 by means of hinges or the like, and a clamp 7 that is attached to the V-groove board 5 and holding board 6. The clamp 7 has an approximately U-shaped transversal cross section (e.g., see FIG. 8), excluding the side surface on opening/closing side of the V-groove board 5 and holding board 6, and forces the V-groove board 5 and holding board 6 in closing directions (in FIG. 1, from both the top and bottom).

A V-groove 8 is formed along a central line on the top of the V-groove board 5 in its longitudinal direction so that optical fibers to be interconnected are positioned with high precision. A single-mode fiber 11 is disposed from the end of the ferule 3 to the center of the V-groove 8, as a first optical fiber (built-in optical fiber) to be connected. A refractive index matching material r of cross-link curing type is applied to an end surface of the optical fiber 11 on the side of the V-groove 8. Then, a holey fiber 51 is matched and connected (butt jointed) to the optical fiber 11 through the refractive index matching material r of cross-link curing type.

Figure 2:
FIG. 2 is a schematic illustration showing a state in which a refractive index matching material of cross-link curing type is applied to an end surface of a single-mode fiber.
Figure 3:
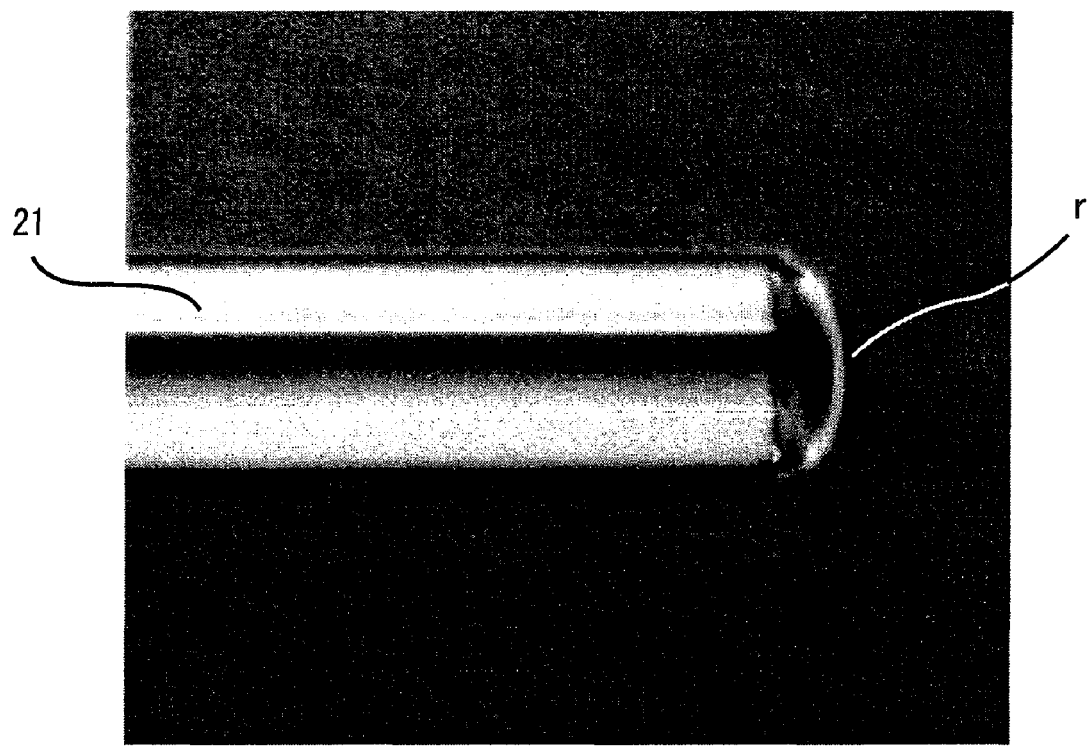
FIG. 3 is an enlarged view of the end surface of the single-mode fiber to which the refractive index matching material of cross-link curing type is applied.

FIG. 2 is a schematic illustration showing a state in which a refractive index matching material of cross-link curing type is applied to an end surface of a single-mode fiber. FIG. 3 is an enlarged view of the end surface of the single-mode fiber to which the refractive index matching material of cross-link curing type is applied. Generally, a sheath 22 is provided on the outer periphery of a glass fiber 21 comprising a core and a cladding. The sheath 22 of the optical fiber 11 is removed by a predetermined length before the optical fiber 11 is placed in the V-groove 8. After the glass fiber 21 is exposed, the refractive index matching material r of cross-link curing type is applied to the end surface of the glass fiber 21 to be connected, as shown in FIGS. 2 and 3. The refractive index matching material r is cured to an approximately hemispherical shape or trapezoidal shape when viewed from a side.

The refractive index matching material r of cross-link curing type can be selected from organic materials with a refractive index matching property, such as acrylic system resin, epoxy system resin, vinyl system resin, ethylene system resin, silicone system resin, urethane system resin, polyamide system resin, polyimide system resin, fluorocarbon system resin, polybutadiene system resin, and polycarbonate system resin so that the necessary refractive index and optical permeability are obtained. There is no restriction to the selection of the refractive index matching material r of cross-link curing type. Here, the refractive index matching material r of cross-link curing type undergoes a cross-linking reaction by means of heat, light, moisture, or electron beams, and changes from a liquid or grease state to an elastic solid state. Any refractive index matching material of cross-link curing type may be used if it allows optical transmission at an interconnected part of optical fibers.

It is preferable that the refractive index of the refractive index matching material r of cross-link curing type is within a range of 1.46±0.05. If the refractive index is outside this range, the connection loss significantly increases and the optical return loss significantly increases. More preferably, the refractive index is within a range of 1.46±0.01 at ordinary temperatures; most preferably, the range of refractive index variations is within ±2% at temperatures from −40 to +70° C.

Furthermore, the optical permeability of the refractive index matching material r of cross-link curing type is preferably 80% or more, and more preferably 90% or more. If the optical permeability is below 80%, the connection loss at the interconnected part of the optical fibers exceeds 1 dB.

Moreover, it is desirable that the break elongation of the refractive index matching material r of cross-link curing type is 50% or more, more desirably 100% or more. If the break elongation is below 50%, a crack or break is likely to occur in the refractive index matching material r of cross-link curing type when it is pressed and deformed at the time of the interconnection of the optical fibers.

In addition, it is preferable that the glass adhesive force of the matching material r of cross-link curing type is 50 g or more per 10-mm width. When the glass adhesive force is below this range, an optical connector for connection such as the optical connector 1 in this embodiment is likely to cause the problem that the refractive index matching material r of cross-link curing type is removed, because the optical fibers are repeatedly connected and disconnected.

In order to determine the glass adhesive force, a 100-μm-thick film layer of the refractive index matching material r of cross-link curing type was formed on a quartz slide glass plate and was cured. The cured film layer was then processed into a strip of 10 mm width. The strip was pealed at a peeling rate of 50 mm/min in a 90° direction relative to the quartz slide glass, according to the 90° peeling method defined in JIS Z 0237. The load obtained during the peeling in this method was defined as the glass adhesive force.

Specifically, after the refractive index matching material r of cross-link curing type has been applied to the end surface of the optical fiber 11 (the first optical fiber) and cured, the adhesive force at the end surface of the first optical fiber is preferably larger than that at an end surface of a second optical fiber to be connected. The optical connector for connection is used repeatedly to connect and disconnect the optical fibers. If the glass adhesive force to the first optical fiber is equal to or smaller than the adhesive force to the second optical fiber, when the second optical fiber (connected optical fiber) is disconnected, the refractive index matching material r of cross-link curing type is likely to be left by attaching to the second optical fiber (disconnected optical fiber). Therefore, it is preferable that the glass adhesive force of the matching material r of cross-link curing type is 50 g or more per 10-mm width.

And besides, it is desirable that the thickness of the applied refractive index matching material r of cross-link curing type is within a range of 5 to 100 μm. If the thickness is smaller than 5 μm, the fibers are easily brought into contact with each other and thus their ends are readily flawed. If the thickness is larger than 100 μm, the space between the end surfaces of the optical fibers is widened and thus it is likely to occur that the axes are misaligned and the fibers are affected by expansion and shrinkage of the refractive index matching material due to temperatures. The thickness of 10 to 60 μm is more preferable; the thickness of 15 to 40 μm is most preferable.

The buildup thickness is measured as the thickest part of the refractive index matching material r of cross-link curing type applied to the end surface of the optical fiber 11 in an approximately hemispherical shape or trapezoidal shape when viewed from a side.

Two spaces (or recesses) 9 are provided in the V-groove 8 formed in the V-groove board 5 so as to relax the stress that is caused by a change in ambient temperature and exerted on the refractive index matching material r of cross-link curing type present in the V-groove 8. In this embodiment, the two spaces 9 are provided in slanted surfaces 8L and 8R on the both sides of the V-groove 8. The spaces 9 are each formed in an approximately hemispherical shape (approximately half circle when the transversal cross section is viewed) along the longitudinal direction of the V-groove 8.

It is preferable that each space 9 has a diameter of 5 to 40 μm. If the diameter is smaller than 5 μm, the volume of the space 9 is insufficient for the cured refractive index matching material r of cross-link curing type to be released, thereby degrading the optical return loss characteristics. If the diameter is greater than 40 μm, the axes of the optical fibers fixed in the V-groove 8 and connected are readily misaligned. The length of the each space 9 is also preferably 15 to 40 μm in the longitudinal direction of the V-groove 8.

Next, a procedure for assembling the optical connector 1 will be described.

The sheath 22 is removed from an end of the optical fiber 11 (the first optical fiber) to expose the glass fiber 21 comprising a core and a cladding. The refractive index matching material r of cross-link curing type is applied to the end surface of the glass fiber 21 by potting, and made to undergo a cross-linking reaction by means of heat, light, moisture, or electron beams so that it is cured.

After the holding board 6 is opened from the V-groove board 5, the optical fiber 11, to which the refractive index matching material r of cross-link curing type has been applied to the end surface of the glass fiber 21, is inserted into the ferrule 3, and the glass fiber 21 is placed in the V-groove 8 in the V-groove board 5. At that time, the cured refractive index matching material r of cross-link curing type is positioned to the spaces 9 in the V-groove 8.

The holding board 6 is then closed; the holding board 6 is overlaid on the V-groove board 5; and the clamp 7 is attached to the V-groove board 5 and holding board 6. The opposite end of the optical fiber 11 and the end of the ferrule 3 are matched by cutting the optical fiber 11 and polishing the cut surface. In this way, the optical connector 1 can be assembled.

Next, a procedure for interconnecting optical fibers by means of the above-mentioned optical connector 1 will be described by using an example in which the holey fiber 51 is used as a second optical fiber.

Firstly, the optical connector 1 is prepared. An end of the holey fiber 51 is cut in advance. As described with reference to FIGS. 7 and 8, the optical connector 1 is fixed to the jig, and wedges are inserted into clearances formed in a side surface of the opening/closing side of the V-groove board 5 and holding board 6 so as to make a gap between the V-groove board 5 and the holding board 6. The holey fiber 51 is inserted into the main connector body 2 from the cut end. The cut end of the holey fiber 51 is brought into contact through the cured refractive index matching material r of cross-link curing type while the holey fiber 51 is being guided in the V-groove 8.

When the wedges are finally removed, the optical fiber 11 and holey fiber 51 are fixed in the main connector body 2 and butt jointed through the cured refractive index matching material r of cross-link curing type, thereby making an optical connection.

The advantages of the present invention will be described below.

As described before, the optical connector 1 has a space 9 in a V-groove 8 formed on a V-groove board 5 so as to relax stress loaded on the refractive index matching material r of cross-link curing type that has been applied to an end surface of a first optical fiber 11 and has been cured. In the optical connector 1 in which the optical fiber 11 has been connected to the holey fiber 51, compression stress, tensile stress, and the like are loaded on the refractive index matching material r of cross-link curing type when the ambient temperature changes and thus thermal expansion/shrinkage occurs.

However, the space 9 provided in the optical connector 1 can relax these stresses exerted on the refractive index matching material r of cross-link curing type. Particularly, when the refractive index matching material r of cross-link curing type is released into the spaces 9 under a compression stress due to the temperature change, the compression stress can be relaxed. When part of the refractive index matching material r of cross-link curing type has been pre-released in the spaces 9 due to the compression stress exerted by a butt joint with the holey fiber 51, a tensile stress to the refractive index matching material r due to the temperature change can be also relaxed.

Accordingly, the optical connector 1 can suppress an increase in the transmission loss of the refractive index matching material r of cross-link curing type applied at the fiber connected part and can reduce variations in their optical characteristics by the temperature change. The optical connector 1 is thereby suitable for interconnection of optical fibers at an outdoor laying site.

Furthermore, the optical connector 1 has the cured refractive index matching material r of cross-link curing type with a glass adhesive force of 50 g or more per 10-mm width, to an end surface of the optical fiber 11. Accordingly, the optical connector 1 makes it hard for the refractive index matching material r of cross-link curing type to enter hollows in the holey fiber 51; prevents the amount of the refractive index matching material r of cross-link curing type disposed between the end surfaces of the interconnected optical fibers from being deleted excessively; and suppresses voids and bubbles from being generated between the end surfaces of the interconnected optical fibers, thereby ensuring stable optical characteristics.

In addition, the optical connector 1 is easy to assemble. When optical fibers are interconnected, neither a special device to seal hollows in the holey fiber 51 nor a fusing machine is required. A connection can be made in a short time at a low cost.

Figure 4:
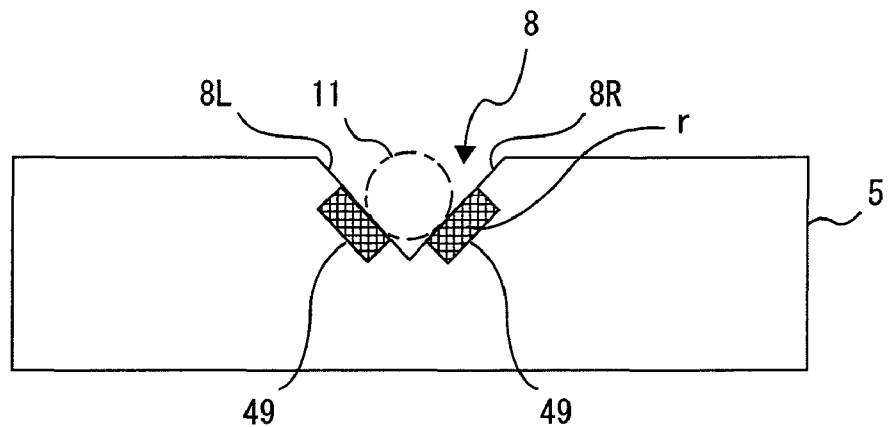
FIG. 4 is a schematic illustration showing a transversal cross sectional view of another example of a V-groove board according to an embodiment of the present invention.
Figure 5:
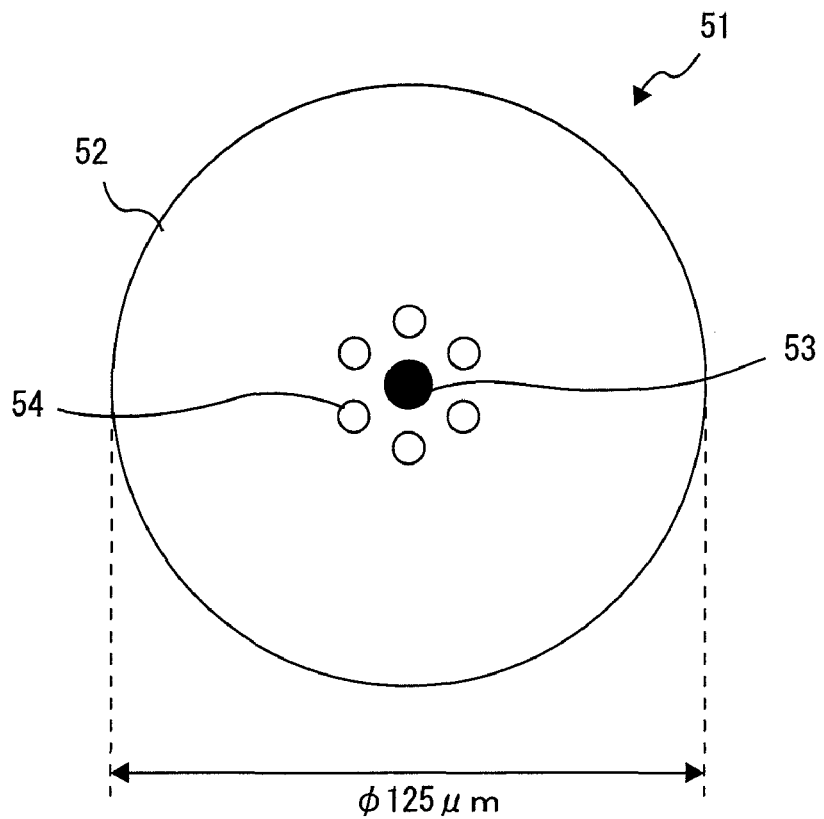
FIG. 5 is a schematic illustration showing a transversal cross sectional view of a typical holey fiber.

FIG. 4 is a schematic illustration showing a transversal cross sectional view of another example of a V-groove board according to an embodiment of the present invention. As a variation of the space 9 in the optical connector 1 according to the present invention, spaces 49 in a cubic or rectangular box-like shape may be provided on the slanted surfaces 8L and 8R on the both sides of the V-groove 8 formed in the V-groove board 5, as shown in FIG. 4. Here, FIG. 4 schematically shows a state in which the refractive index matching material r of cross-link curing type is released to (flows in) the spaces 49, as well as in FIG. 1B. The variation provides the same advantages as described above.

In this variation, it is preferable that one side of each space 49 has a length of 5 to 40 μm. If the one side is smaller than 5 μm, the volume of the space 49 is insufficient for the cured refractive index matching material r of cross-link curing type to be released, thereby preventing stable optical return loss characteristics from being obtained. If the one side is larger than 40 μm, the axes of the optical fibers fixed in the V-groove 8 and connected are readily misaligned. Although the above embodiment has been explained by using an example in which spaces are provided on the slanted surfaces 8L and 8R on both sides of the V-groove 8, only either slanted surface may be provided with a space. Although, in the above embodiment, the optical fiber 11 included in the optical connector 1 has been connected to the holey fiber 51, single-mode fibers may be interconnected.

EXAMPLES

Example 1 and Comparative Example 1

In order to prepare the refractive index matching material r of cross-link curing type, 1.0 part by weight of Coronate L (a registered trademark of Nippon Polyurethane Industry Co., Ltd.) was blended to 100 parts by weight of 50% acetic ether solution based on acrylic acid resin, and was mixed, wherein the acetic ether solution comprised n-butyl acrylate, butyl acrylate, acrylic acid, and 2-hydroxyethyl methacrylate copolymer (blending ratio=82:15:2.7:0.3). The optical permeability of an acrylic adhesive applying liquid used as the obtained refractive index matching material r of cross-link curing type was measured in a wavelength range of 1300 to 1600 nm, by using a spectrophotometer; the result was 93 to 95%. The refractive index of the acrylic adhesive applying liquid was also measured by using an Abbe refractometer at an ordinary temperature; the result was 1.465±0.005.

A film of 100 μm thickness was formed from the acrylic adhesive applying liquid and then was processed into a strip specimen of 10 mm width. Its break elongation was measured at a tensile rate of 50 mm/min; the result was 200% to 300%. A 100-μm-thick film layer of the refractive index matching material r of cross-link curing type was formed on a quartz slide glass plate and was cured. The cured film layer was then processed into a strip of 10 mm width. The strip was pealed at a peeling rate of 50 mm/min in a 90° direction relative to the quartz slide glass, according to the 90° peeling method defined in JIS Z 0237. When the load during the peeling was measured, the glass adhesive force was 500 to 1000 g per 10-mm width.

The refractive index matching material r of cross-link curing type obtained as described above was applied, by potting, to an end surface of a fiber and then was cured; to prepare the end surface, the sheath of an optical fiber (BBG-SM-WF from Hitachi Cable, Ltd., with an outer diameter of about 250 μm and a fiber diameter of 125±1 μm) was removed by about 200 mm, the exposed surface of the glass fiber was cleaned with alcohol, and the end of the glass fiber was cut at right angles within an error of 1° with a fiber cutter. The buildup thickness of the refractive index matching material r of cross-link curing type was 20 to 25 μm.

The optical fiber, to which the obtained refractive index matching material r of cross-link curing type was applied, was inserted into the ferrule 3 and was fixed. The glass fiber was then cut at the end of the ferrule 3, and the cut surface was polished. In this way, the optical connector 1 of Example 1 was assembled. Five optical connectors 1 of this type were prepared. In the optical connector 1, two cubic spaces 49 with one side of 10 μm were provided in the V-groove 8 of the V-groove board 5.

On the other hand, five conventional optical connectors 61 without spaces in the V-groove 66 of the V-groove board 63 (Comparative example 1), as shown in FIGS. 7 and 8, were also prepared in the similar way.

The sheath of the holey fiber 51 (BBG-HF from Hitachi Cable, Ltd., with an outer diameter of about 250 μm and a fiber diameter of 125±1 μm) was removed at one end. The exposed surface of the glass fiber was cleaned with alcohol, and the end of the glass fiber was cut at right angles with a fiber cutter. Holey fibers 51 prepared in this way were inserted into the optical connector 1 of Example 1 and the optical connector 61 of Comparative example 1, and mechanical splice connection was performed for these fibers. The connected holey fibers 51 were measured for the initial connection loss and the optical return loss. Increases in the connection loss and optical return loss were also measured while the holey fibers 51 were being left for 24 hours at ordinary temperatures (23±2° C.).

Example 2 and Comparative Example 2

As another refractive index matching material r of cross-link curing type, an addition silicone adhesive applying solution was prepared in which the solution comprised SD4590, BY24-741, SRX212, and toluene (100:1.0:0.9:50 parts by weight, these substances being all available from Dow Corning Toray Co., Ltd.). The optical permeability of the addition silicone adhesive applying solution used as the obtained refractive index matching material r of cross-link curing type was measured in a wavelength range of 1300 to 1600 nm, by using a spectrophotometer; the result was 92% to 94%. The refractive index of the addition silicone adhesive applying solution was also measured by using an Abbe refractometer at an ordinary temperature; the result was 1.465±0.005.

A film of 100 μm thickness was formed from the silicone adhesive applying liquid and then was processed into a strip specimen of 10 mm width. Its break elongation was measured at a tensile rate of 50 mm/min; the result was 200% to 300%. A 100-μm-thick film layer of the refractive index matching material r of cross-link curing type was formed on a quartz slide glass plate and was cured. The cured film layer was then processed into a strip of 10 mm width. The strip was pealed at a peeling rate of 50 mm/min in a 90° direction relative to the quartz slide glass, according to the 90° peeling method defined in JIS Z 0237. When the load during the peeling was measured, the glass adhesive force was 500 to 1000 g per 10-mm width.

The refractive index matching material r of cross-link curing type obtained as described above was used to prepare five optical connectors 1 of Example 2. On the other hand, five conventional optical connectors 61 of Comparative example 2, as shown in FIGS. 7 and 8, were also prepared. Using these samples, the test of connection to the holey fiber 51 was performed in the above-mentioned way. Results are shown in Table 1.

TABLE 1

|  |  | Example 1 Spaces in V-groove | Comparative example 1 No spaces in V-groove | Example 2 Spaces in V-groove | Comparative example 1 No spaces in V-groove |
|---|---|---|---|---|---|
| Initial stage at ordinary temperatures | Connection loss (dB) | 0.1 to 0.4 | 0.1 to 0.4 | 0.2 to 0.5 | 0.2 to 0.5 |
|  | Optical return loss (dB) | −60 to −45 | −60 to −45 | −55 to −45 | −53 to −45 |
| While being left for 24 hours at ordinary temperatures | Increase in connection loss (dB) | 0.00 to 0.03 | 0.00 to 0.02 | 0.00 to 0.03 | 0.00 to 0.03 |
|  | Variations in optical return loss (dB) | 3 | 18 | 3.5 | 15 |

Measured wavelength λ = 1550 nm,
Light source: LED

As shown in Table 1, because each optical connector 1 of Examples 1 and 2 has two spaces 49 in the V-groove 8, it can be considered that the refractive index matching material r of cross-link curing type was released to the spaces 49 when the fibers were interconnected or the ambient temperature changed, and that the internal stress loaded on refractive index matching material r of cross-link curing type was relaxed. As a result, variations in the optical return loss for 24 hours could be suppressed to 3 to 3.5 dB.

By contrast, since each optical connector 61 of Comparative examples 1 and 2 has no spaces in the V-groove 66, there is no effect to relax the internal stress loaded on the refractive index matching material r of cross-link curing type. As a result, variations in the optical return loss for 24 hours were as large as 15 to 18 dB.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical connector comprising:
a ferrule and a V-groove board connected to the ferrule,
wherein a first optical fiber and a second optical fiber are butt jointed in a V-groove formed in the V-groove board so as to be interconnected;
the second optical fiber is connected to the first optical fiber through a refractive index matching material of cross-link curing type applied to an end surface on the V-groove board side of the first optical fiber, the refractive index matching material being in an elastic solid state; and
a space, is not completely penetrating the V-groove board, is provided in the V-groove board adjacent to the V-groove, such that the space faces the butt jointed portion between the first and second optical fibers; and that when a compression stress is loaded on the refractive index matching material of cross-link curing type, the refractive index matching material of cross-linked curing type is released into the space so as to relax the compression stress.

2. The optical connector according to claim 1, wherein:
shape of the space is cubic, rectangular box-like, or semi-columnar in the longitudinal direction of the V-groove.

3. The optical connector according to claim 1, wherein:
shape of the space is cubic or a rectangular box-like in the longitudinal direction of the V-groove; and one side of the shape is within a range of 5 to 40 μm.

4. The optical connector according to claim 1, wherein:
the refractive index matching material of cross-link curing type has a refractive index of 1.46±0.05, an optical permeability of 80% or more, a break elongation of 50% or more, and a glass adhesive force of 50 g or more per 10-mm width.

5. The optical connector according to claim 1, wherein:
a buildup thickness of the refractive index matching material of cross-link curing type is within a range of 5 to 100 μm.

6. The optical connector according to claim 1, wherein:
the second optical fiber is a single-mode fiber or a holey fiber.

7. An optical connector comprising: a ferrule and a V-groove board connected to the ferrule,
wherein a first optical fiber and a second optical fiber are jointed in a V-groove formed in the V-groove board so as to be interconnected;
the second optical fiber is connected to the first optical fiber through a refractive index matching material of cross-link curing type applied to an end surface on the V-groove board side of the first optical fiber, the refractive index matching material being in an elastic solid state; and
a space is not completely penetrating the V-groove board is provided in the V-groove board adjacent to the V-groove, such that the space faces the jointed portion between the first and second optical fibers; and that when a compression stress is loaded on the refractive index matching material of cross-link curing type, the refractive index matching material of cross-link curing type is released into the space so as to relax the compression stress.

8. The optical connector according to claim 7, wherein:
shape of the space is cubic, rectangular box-like, or semi-columnar in the longitudinal direction of the V-groove.

9. The optical connector according to claim 7, wherein:
shape of the space is cubic or a rectangular box-like in the longitudinal direction of the V-groove; and one side of the shape is within a range of 5 to 40 μm.

10. The optical connector according to claim 7, wherein:
the refractive index matching material of cross-link curing type has a refractive index of 1.46±0.05, an optical permeability of 80% or more, a break elongation of 50% or more, and a glass adhesive force of 50 g or more per 10-mm width.

11. The optical connector according to claim 7, wherein:
a buildup thickness of the refractive index matching material of cross-link curing type is within a range of 5 to 100 μm.

12. The optical connector according to claim 7, wherein:
the second optical fiber is a single-mode fiber or a holey fiber.

* * * * *